Oct. 2, 1951     W. C. JAEGLE ET AL     2,569,857
COMBINED MIXING UNIT AND HOSE RACK
Filed March 6, 1946
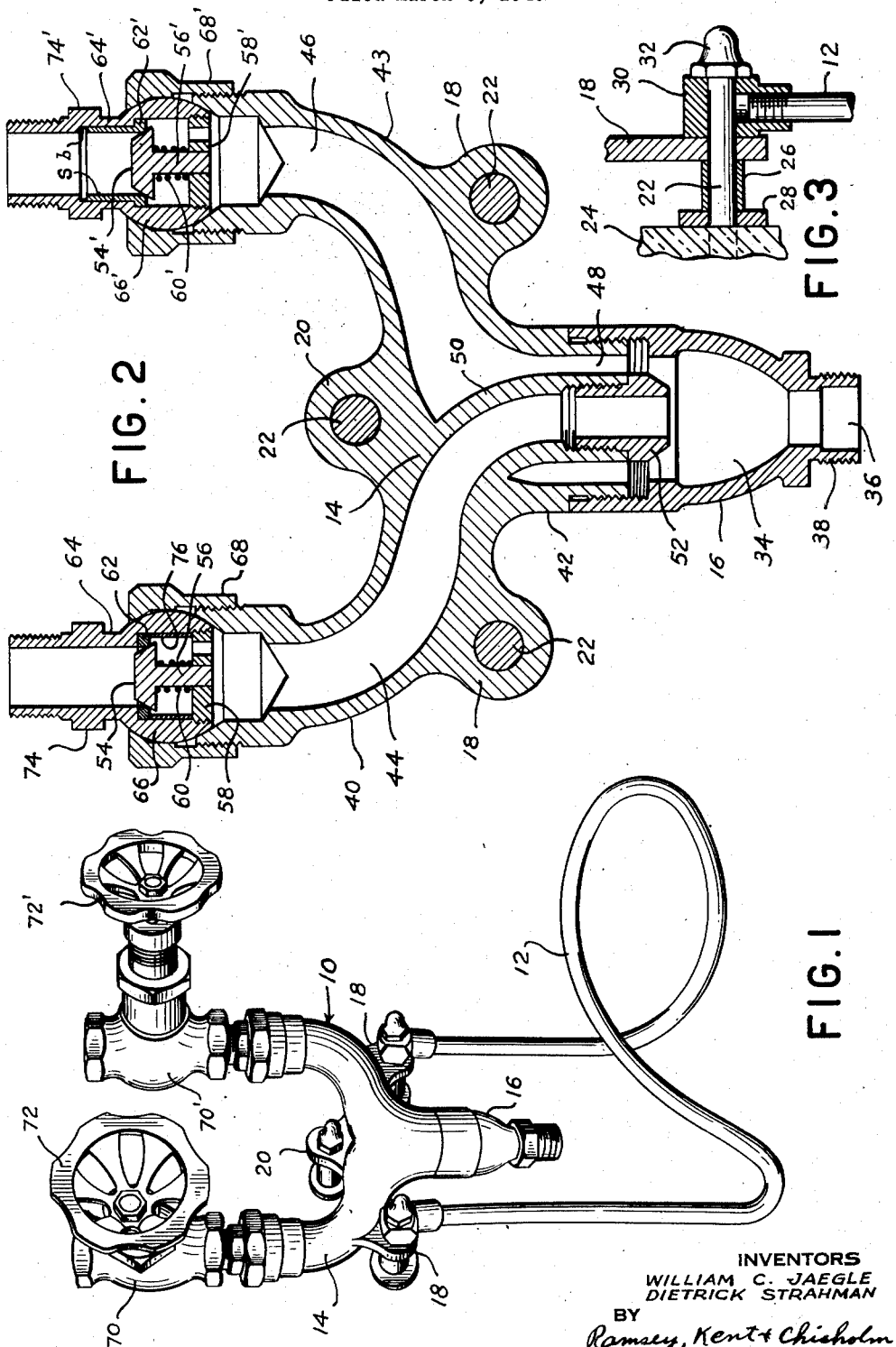
INVENTORS
WILLIAM C. JAEGLE
DIETRICK STRAHMAN
BY
Ramsey, Kent & Chisholm
ATTORNEYS Patented Oct. 2, 1951

2,569,857

UNITED STATES PATENT OFFICE 2,569,857

COMBINED MIXING UNIT AND HOSE RACK

William C. Jaegle, Hicksville, N. Y., and Dietrick Strahman, Livingston, N. J., assignors to Klingerit Inc., New York, N. Y., a corporation of New York Application March 6, 1946, Serial No. 652,368

2 Claims. (Cl. 137—111)

1

This invention relates to fluid mixing devices and particularly to a unit for mixing fluids prior to delivery to a hose or the like.

An important object of this invention is to provide an improved mixing unit adapted to be mounted on a wall or other support which efficiently mixes fluids prior to delivery to a hose used for cleaning purposes. Another object of this invention is to provide a novel fluid mixing device especially adapted for use in industrial plants and which is constructed to prevent the backing up of any of the fluids delivered thereto and which is self-adjustable in the event the delivery lines to the unit are not in parallel relationship. A further object of this invention is to provide an improved mixing device of this character which is constructed for efficient and long service and provides positive and complete mixing of the fluids. A further object of this invention is to provide a novel combination of mixing unit and hose rack, utilizing as a feature thereof the same means for mounting the unit on a wall for also supporting the hose rack on the unit.

This invention is clearly defined in the appended claims. In the claims, as well as in the description, parts are at times identified by specific means for clarity and convenience, but such nomenclature is to be understood as having the broadest meaning consistent with the context and with the concept of the invention as distinguished from the pertinent prior art. The best form in which we have contemplated applying our invention is illustrated in the accompanying drawings forming part of this specification, in which:

Fig. 1 is a perspective view of a mixing unit and hose rack assembly embodying this invention;

Fig. 2 is an enlarged vertical sectional view through the mixing device of Fig. 1, and Fig. 3 is a fragmentary sectional view of the construction for attaching the hose rack to the unit and for mounting the unit on a wall or other support.

For use in industrial plants, such as in dairies, it is preferred to mount the assembly upon a wall or other support, and preferably for reasons of cleanliness and health to mount the assembly in spaced relation to the wall. The complete assembly includes a fluid mixing device having inlets for receiving fluids of different characteristics, an outlet shaped to connect a hose thereto, and a rack for supporting a hose. Fluids, such as hot water and cold water, or steam and cold water, may be delivered to the device for intermixture therein prior to delivery to the hose. The whole assemblage mounted upon a wall may be referred to as a hose station.

2

The assembly comprises in general a tubular body of bifurcated or Y-shaped configuration indicated at 10 in Fig. 1 in which the fluids are mixed prior to delivery to a hose. The two branches of the bifurcated body serve as fluid inlet passages and the base or trunk portion of the body serves as a mixing chamber and discharge outlet. A hose rack 12 is attached to the body. The rack is preferably formed by bending a single elongated rod intermediate its ends to form a cradle for receiving and supporting a coiled hose and having the ends of the rod attached to the body. The same means which attaches the hose rack to the body also serves to mount the body upon a wall.

Referring more specifically to the drawings, the bifurcated body 10 preferably consists of a main tubular element 14 of bifurcated, of Y-shaped formation to the base or trunk portion of which is attached a smaller tubular element 16. The latter is preferably detachably secured to the main body member 14 by threaded engagement thereto as shown in Fig. 2; and a gasket or other suitable means (not shown) may be employed to make the connection fluidtight. The two body members, 14 and 16, together form the fluid mixing and delivery device generally indicated at 10 in Fig. 1.

The main bifurcated element 14 is preferably cast in the tubular formation illustrated and is preferably formed of bronze. Cast integrally with the main body member 14 are two correspondingly shaped flanges or ears 18, 18 on either side of the base portion and a third similarly shaped flange or ear 20 located above the juncture of the two branches of the body. These flanges are arranged substantially in the same plane, and each is apertured to receive a bolt member 22. As shown in Fig. 3, each bolt member extends into a wall 24 or other form of support and by this means the assembly is mounted in elevated position above the floor. For sanitary and health reasons, the assembly is mounted in spaced relation to the wall. This is accomplished by the provision of suitable spacers on the bolt members between the flanges and the wall, such as the sleeve 26 and washer 28 shown in Fig. 3.

As previously mentioned, the hose rack is secured to the mixing device by the same means which mounts the device upon the wall. Threadedly received on each end of the rod 12 forming the rack is a connector 30 having an aperture therethrough extending perpendicularly into the end of the rod. The two bolt members which extend through the flanges 18, 18 also extend through the apertures of the connectors in the manner shown in Fig. 3. Heads or cap nuts 32 on the ends of the bolt members secure the parts assembled thereon tightly together.

The smaller body member 16 of the device 10 forms a fluid mixing chamber 34. The bottom end of the member 16 is reduced and provided with a fluid discharge outlet 36 to which a hose is connectible. Any suitable means may be provided on the reduced end portion for detachably coupling a hose thereto, such as the provision of external threads 38 therearound. The wall of the mixing chamber 34 is convergingly shaped to direct the mixed fluids to the discharge outlet 36.

The two branches 40 and 43 of the bifurcated body member 14 are provided with passages which open out through the upper extremities of the branches and extend downwardly to the juncture of the branches to the base or trunk portion 42 of the body. One such passage is indicated at 44 and is referred to as the steam inlet passage. The other such passage is indicated at 46 and is referred to as the water inlet passage. The trunk portion 42 of the body is provided with an annular passage 48 which, as shown in Fig. 2, communicates directly with the water inlet passage 46.

The branch 40 of the bifurcated body member 14 is provided at the juncture thereof to the trunk portion 42 with a tubular extension 50 which projects into the passage 48 and downwardly therein substantially as far as the upper limits of the mixing chamber 34. This extension 50 forms a prolongation of the steam inlet passage 44 and steam conveyed therethrough is prevented from intermixture with the water flowing in the passage 48 until both fluids enter the mixing chamber. As shown in Fig. 2, the tubular extension 50 has an outside dimension less than that of the passage 48 and is disposed in spaced relationship thereto on all sides to form an annular space for the flow of water therearound. For the major portion of its length the extension 50 is positioned axially in the passage 48 and the discharge end thereof terminates substantially on the level with the lower end of the trunk portion 42. It is preferred that the tubular extension 50 form an integral part of the body 14 by casting it originally therewith.

After a long period of use, the discharge end of the tubular extension 50 may burn out or deteriorate. To offset this, the discharge end of the tubular extension is provided with a removable steam jet nozzle 52. The lower discharge end of the extension 50 is internally threaded and the nozzle 52 is correspondingly externally threaded to effect the connection. In order not to provide any obstruction to the flow of the fluids, the threaded portions of the extension and the nozzle are reduced in thickness so that as shown in Fig. 2 the steam passage in the nozzle is substantially the same diameter as that in the extension, and the outside dimension of the nozzle is substantially equal to that of the extension. Access to the nozzle 52 for replacement is obtained by disconnecting the body member 16 from the trunk portion 48.

In order to prevent backing up of steam in the water delivery line or water in the steam delivery line, and to assure efficient operation, check valves are provided at the connection of these lines to the branches 40 and 43. The check valve for the steam line is indicated at 54; that for the water line at 54'. The check valves 54 and 54' are correspondingly shaped, and each is provided with a valve stem indicated respectively at 56 and 56' mounted for reciprocating movement in apertured supports or spiders 58 and 58' respectively. A coil spring 60 or 60' enclosing its respective valve stem yieldingly urges the valve heads into engagement with the valve seats indicated respectively at 62 and 62'. The direction in which these valves are urged by their respective springs is counter to the flow of fluid, and it is evident that the valves will close upon their respective seats before any return flow of fluid occurs.

Frequently the pipe lines which are to deliver the fluids to the inlet passages 44 and 46 are not in exact parallel relationship. To accommodate the device for this irregularity in installation, tubular fittings are provided at the entrances to these passages which have a universal movement. A feature of this invention is the mounting of the check valves in these fittings to conserve space and to reduce the movement of parts. As shown in Fig. 2, the steam and water inlet passages 44 and 46 are provided with correspondingly formed universally movable fittings, comprising sleeves 64 and 64' respectively. The bottom end of each sleeve is rounded at 66 or 66' to form a ball joint, and the mouths of the passages 44 and 46 are outwardly flared to accommodate these rounded portions and make a ground fluid-tight fit therewith. Threaded to the ends of the branch portions 40 and 43 are collars 68 and 68' respectively which enclose the ball joint and clamp them in position in a manner that is well understood. The check valve structures previously described are located in the ball joint portions of the sleeve and turn their respective sleeves in any direction it may swing.

The upper end of each sleeve 64 and 64' is externally threaded for receiving a valve fitting 70 and 70' respectively as shown in Fig. 1. These valve fittings are provided with handles 72 and 72' for controlling the supply of fluid to the mixing device. An intermediate portion of each sleeve 64 or 64' is shaped with a polygonal portion 74 or 74' to facilitate turning movement thereof by a wrench or other tool. The collars 68 and 68' and valve fittings 70 and 70' are similarly provided with polygonal exterior portions for the same purpose.

To prevent the valve seats 62 and 62' from loosening under expansion due to temperature changes, they may be held in place in their respective universal joints by any suitable means forming a shoulder. As shown in the steam line at the left of Fig. 2, a short thin sleeve 76 bridges the space between the valve seat 62 and the valve stem guiding support 58. This forms a shoulder abutting the valve seat, and threaded adjustment of the support 58 will tighten the valve seat immovably in place. Alternatively, the valve seat may be provided with an integral sleeve $s$ which is forcibly inserted into a counterbore $b$ with which it makes a tight frictional fit. In any one mixing unit, one or the other means for securing the valve seat will ordinarily be used for both valve seats, but for the purpose of illustrating them both, one securing means has been shown for the valve seat 62 and the other shown for the valve seat 62'.

In operation, water is introduced into the valve fitting 70' by a line communicating with a source of water under pressure. The water flows through the universal joint past the check valve 54' and into the passage 46 from which it flows into the annular space 48 surrounding the tubular extension 50. Steam, or hot water if desired, is introduced into the valve fitting 70 by a steam line communicating with a source of steam pressure. The check valve 54 opens to permit flow of the steam through the universal joint into the passage 44 and thence into the tubular extension 50. The steam is injected axially into the water stream as both fluids enter the mixing chamber 34. The latter is greater in cross section than either the water or steam passages opening thereinto. The fluids mixed in the chamber 34 are discharged from the outlet 36 into the end of a hose connected thereto. Adjustment of the valve control handles 72 and 72' will regulate the proportions of the steam and water mixed together prior to delivery to the hose. The check valves as previously described will prevent backing up of either fluid into the delivery line of the other fluid.

As previously described, the bifurcated body member 14, including the tubular extension 50 in the interior thereof, is preferably formed of bronze and cast in the formation illustrated in the drawings. Similarly, the body member 16 forming the mixing chamber 34 is preferably a bronze casting. The hose rack rod 12 and the replaceable steam jet nozzle 52 may be formed of stainless steel. The movable check valve members 54—56 and 54'—56' and their valve seats 62 and 62' may both be formed of stainless steel, or, alternately, of bronze and stainless steel, to provide dissimilar metals for each valve-head and its seat.

What we claim is:

1. A mixing unit comprising, in combination, a tubular body of bifurcated formation having in each bifurcated section thereof a passage extending therethrough and merging with the other passage into a common outlet at the juncture of the bifurcated sections thereof, means for delivering fluids of different characteristics to the outer ends of said passages for flow therethrough and for mixture at said common outlet, means for detachably connecting one end of a hose to said common outlet, and a universal joint having a check valve mounted therein positioned in the outer end of each of said passages.

2. A fluid mixing device comprising, in combination, a cast metal body of a generally Y-shaped configuration having a passage in the trunk portion thereof and a steam inlet passage in one of the branch portions thereof and a water inlet passage in the other branch portion thereof, said water inlet passage opening directly into the passage of said trunk portion, the branch portion having said steam inlet passage being provided with a tubular extension cast integrally with the body and projecting into the passage of the trunk portion to form a continuation of the steam inlet passage, said tubular extension having an outside dimension less than that of the trunk passage and arranged in spaced relation to the walls thereof with the discharge outlet of the extension substantially on the axis thereof, a tubular fitting mounted for universal movement in the upper extremity of each of the branch portions and communicating with the passage therein, means for introducing steam under pressure into the tubular fitting communicating with said steam inlet passage, means for introducing water under pressure into said other tubular fitting communicating with said water inlet passage, and a check valve in each of said tubular fittings preventing return flow of fluid.

WILLIAM C. JAEGLE.
DIETRICK STRAHMAN.

REFERENCES CITED

The following references are of record in the file of this patent:

UNITED STATES PATENTS

| Number | Name | Date |
|---|---|---|
| 156,228 | Mathinet | Oct. 27, 1874 |
| 953,330 | Gordon | Mar. 29, 1910 |
| 1,075,490 | Osbourn | Oct. 14, 1913 |
| 1,231,305 | Shepherd | June 26, 1917 |
| 1,244,818 | Wirt | Oct. 30, 1917 |
| 1,680,119 | Schulder | Aug. 7, 1928 |
| 1,903,085 | Barnes | Mar. 28, 1933 |
| 1,920,062 | Casani | July 25, 1933 |
| 1,929,854 | Rogers | Oct. 10, 1933 |
| 1,998,068 | Barnes | Apr. 16, 1935 |

FOREIGN PATENTS

| Number | Country | Date |
|---|---|---|
| 48,482 | Sweden | Feb. 2, 1921 |
| 63,014 | Norway | Nov. 18, 1940 |
| 498,834 | Great Britain | Jan. 16, 1939 |